United States Patent
Kaku et al.

(10) Patent No.: US 7,860,678 B2
(45) Date of Patent: Dec. 28, 2010

(54) APPARATUS AND METHOD FOR AUTOMATED ADJUSTMENT AND SETTING OF APD OPTICAL RECEIVER OPERATION POINT

(75) Inventors: Shinkyo Kaku, San Jose, CA (US); Vitali Tikhonov, Mountain View, CA (US); Severino Tolentino, Pacifica, CA (US)

(73) Assignee: Allied Telesis, Inc., San Jose, CA (US)

( * ) Notice: Subject to any disclaimer, the term of this patent is extended or adjusted under 35 U.S.C. 154(b) by 242 days.

(21) Appl. No.: 12/007,215

(22) Filed: Jan. 8, 2008

(65) Prior Publication Data

US 2008/0215280 A1    Sep. 4, 2008

Related U.S. Application Data

(60) Provisional application No. 60/879,016, filed on Jan. 8, 2007.

(51) Int. Cl.
*G01R 35/00* (2006.01)
(52) U.S. Cl. .................. 702/107; 702/191; 702/193; 398/202; 250/214 C; 250/238; 356/73.1; 356/5.01
(58) Field of Classification Search .............. 702/191, 702/107, 193; 398/26, 27, 38, 202; 250/214 AG, 250/214 A, 214 C, 238, 205; 356/73.1, 5.01; 375/242
See application file for complete search history.

(56) References Cited

U.S. PATENT DOCUMENTS

| | | | | |
|---|---|---|---|---|
| 4,947,459 A | * | 8/1990 | Nelson et al. ................ 398/26 |
| 5,929,982 A | * | 7/1999 | Anderson .................. 356/73.1 |
| 5,953,690 A | * | 9/1999 | Lemon et al. ............... 702/191 |
| 6,222,660 B1 | * | 4/2001 | Traa .......................... 398/213 |
| 6,580,531 B1 | * | 6/2003 | Swanson et al. ................ 398/5 |
| 6,839,425 B1 | * | 1/2005 | Huang et al. ........... 379/399.01 |
| 7,060,970 B2 | * | 6/2006 | Cheung et al. .............. 250/238 |
| 7,155,133 B2 | * | 12/2006 | Stewart et al. .............. 398/202 |
| 7,206,516 B2 | * | 4/2007 | Eiselt .......................... 398/147 |
| 7,599,620 B2 | * | 10/2009 | Graves et al. ................ 398/51 |
| 2002/0057480 A1 | * | 5/2002 | Ushiyama ................... 359/194 |
| 2003/0048434 A1 | * | 3/2003 | Beller ....................... 356/73.1 |
| 2004/0129863 A1 | * | 7/2004 | Cheung et al. .......... 250/214 C |
| 2007/0116460 A1 | * | 5/2007 | Fediakine et al. ............. 398/38 |
| 2007/0248357 A1 | * | 10/2007 | Fediakine et al. ............. 398/27 |

* cited by examiner

*Primary Examiner*—Carol S Tsai
(74) *Attorney, Agent, or Firm*—Arent Fox LLP (57) ABSTRACT

A method for automated calibration of an avalanche photodiode receiver includes measuring two values of avalanche photodiode biases at two successive times, measuring and comparing a bit error rate corresponding to each value. When the bit error rate of the second value is equal to or greater than the bit error rate of the first value, then a third value and a fourth value of avalanche photodiode bias closer together are measured. When the bit error rate of the fourth value is smaller than the bit error rate of the third value, two subsequent values as third value and fourth value are measured, and an optimum avalanche photodiode bias when the bit error rate of the fourth value is equal to the bit error rate of the third value is measured.

21 Claims, 7 Drawing Sheets

APPARATUS AND METHOD FOR AUTOMATED ADJUSTMENT AND SETTING OF APD OPTICAL RECEIVER OPERATION POINT

This application claims the benefit of from Provisional Application No. 60/879,016, filed in the U.S. Patent and Trademark Office on Jan. 8, 2007, the contents of which are incorporated herein by reference in their entirety.

FIELD OF INVENTION

The present invention relates to a method and apparatus for automated calibration and adjustment of an avalanche photodiode (APD) photo-receiver during manufacturing.

BACKGROUND OF THE INVENTION

An avalanche phenomenon occurs when light is incident to an optical diode and a reverse-bias voltage is increasingly applied, thereby producing electrons that are accelerated in an electric field, further resulting in cascading atomic collisions. This avalanche produces new electrons and holes for electrical conductive use in a device. An avalanche photodiode (APD) is used for converting an optical signal into an electrical signal and as a light-receiving element in an optical communication system, which makes it highly useful in digital communications systems. Further, the APD normally includes its own gain control, which makes it effective in detecting low levels of light.

In many optical communications systems, an active avalanche photodiode (APD) gain control circuit is used in an optical receiver, which conventionally includes a bias generator for varying the bias on a variable gain APD in response to bias control values generated by a controller. APDs have gained increased consideration for use in such systems because they are capable of amplifying photocurrent internally, without the need for optical pre-amplification. It has been found that an optimized APD gain can improve the performance of optical communication systems. Furthermore, the bit error rate (BER) of an APD photo-receiver has been correlated with APD gain. In general, a logarithmic expression of BER evolves along two regimes with respect to APD bias. A first regime, in which BER drops with increasing APD bias voltage, and a second regime, where BER shows a local minimum.

Measuring BER using a programmable attenuator (ATT) and power monitor (PM) is the conventional method to set the APD operation point in laboratory test conditions, which requires human input and both ad-hoc and/or predetermined decision-making.

However, the conventional technique requires human intervention decision-dependent routines. Thus, there is an unmet need in the prior art to provide an automated mechanism for optimizing the APD optical receiver operation. Accordingly, it would be advantageous to provide an automated method and apparatus for adjusting and setting the APD operation point without human intervention.

SUMMARY OF THE INVENTION

In light of the above described problems and shortcomings, various exemplary embodiments of the systems and methods according to this invention comprise a method and apparatus for automated adjustment and setting of an avalanche photodiode optical receiver operation point.

It is an advantage of the present invention to provide a method and apparatus for finding and optimizing the operation point based upon dependence characteristics of BER versus APD bias voltage.

It is yet another advantage of the present invention to provide a method and apparatus for finding and optimizing the operation point based upon BER-related dependent characteristics versus APD bias voltage.

Additional aspects and advantages of the disclosed embodiments are set forth in part in the description that follows, and in part are obvious from the description, or may be learned by practice of the disclosed embodiments. The aspects and advantages of the disclosed embodiments may also be realized and attained by the means of the instrumentalities and combinations particularly described as follows, including the figures.

BRIEF DESCRIPTION OF THE DRAWINGS

Various exemplary embodiments of the systems and methods of the present invention will be described in detail, with reference to the following figures, wherein.

DETAILED DESCRIPTION

Figure 1:
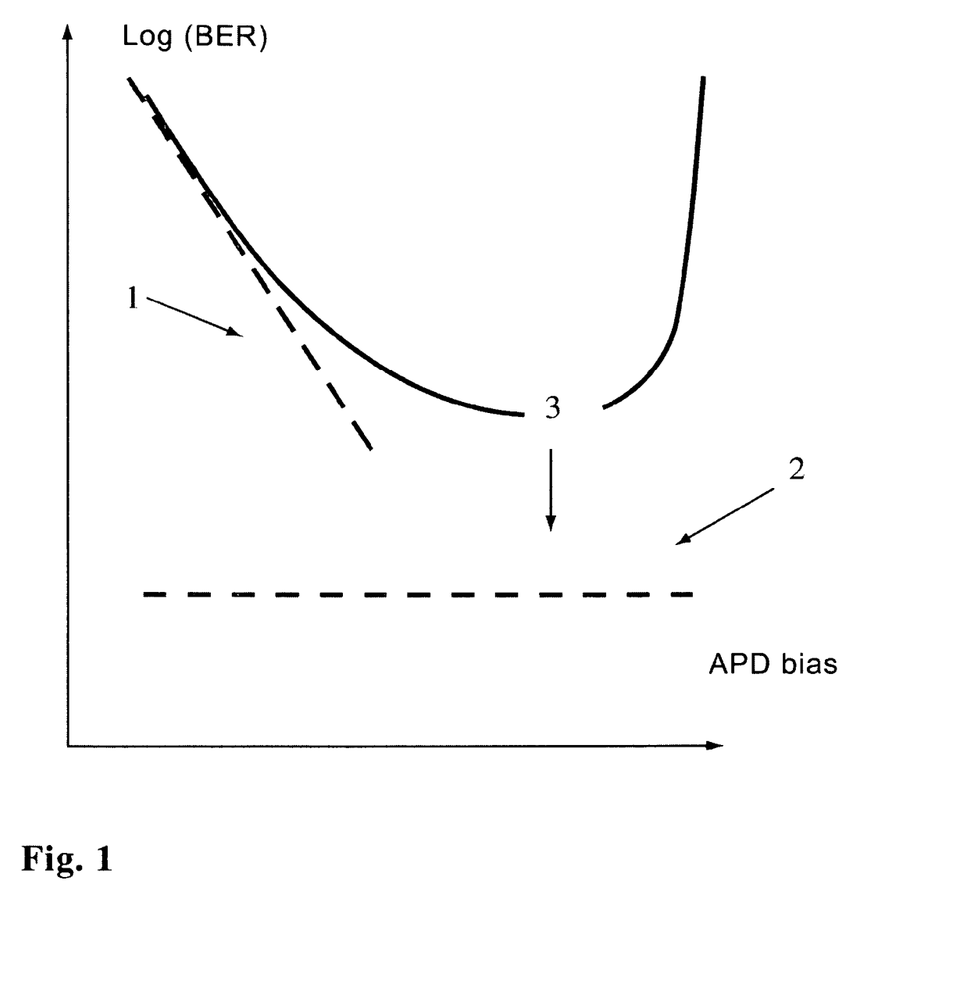
FIG. 1 is a curve depicting the evolution of BER with respect to APD bias according to an embodiment of the present invention.

FIG. 1 depicts a typical curve illustrating the dependence of the BER versus APD bias. The present invention provides a fully automated apparatus and method for determining the optimal APD operation point based on using dependence characteristics of BER or related parameters versus APD bias voltage.

As illustrated in FIG. 1, there are two main regimes of logarithmic curve behavior including a slope 1 and a plateau 2. Specifically, the first regime is characterized by a rapidly descending BER value with increasing APD bias voltage, wherein this rapid slope is linear on the logarithmic scale. The second regime corresponds to the region where the curve has a local minimum 3. The first regime is characterized in that the changing of attenuation (ATT) and APD bias in the fixed proportion relation:

$$\Delta(ATT)/\Delta(APD\ bias) = \text{constant} \qquad (1)$$

which results in a BER-constant dependence. The second regime having a plateau 2 corresponds to measurements accompanied by gradual and precise changing of the APD bias, the minimum of BER is determined at a fixed level of the programmable attenuator ATT. According to various exemplary embodiments of the present invention, this method is performed by determining the minimum value of BER. The local minimum 3 in this embodiment of the present invention corresponds to a position of an optimal APD operation point.

Figure 2:
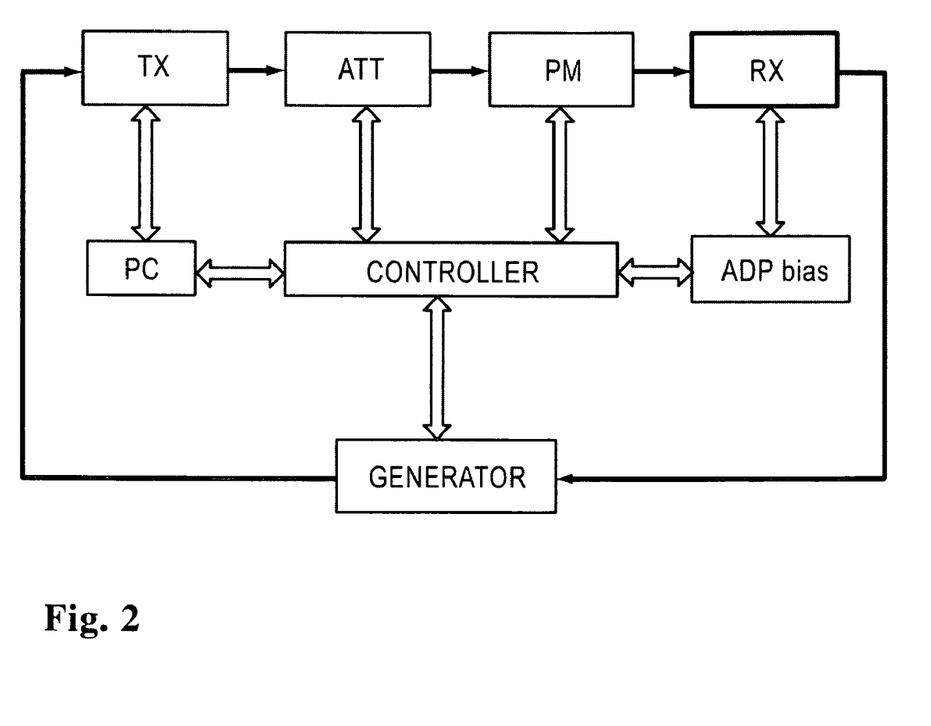
FIG. 2 depicts a system for automated APD photo-receiver calibration, according to an embodiment of the present invention.

According to an exemplary embodiment of the present invention, FIG. 2 depicts an automated apparatus for APD photo-receiver calibration. This embodiment includes a transmitter (TX) that can take various forms, including a complex line card with a short reach optical transceiver input and long haul Dense Wavelength Division Multiplexing (DWDM) output with DWDM processor inside, or an optical laser with electrical input interface. Further, it may include a generator, e.g., general bit error rate tester (BERT) packet generator or an ETHERNET/SONET packet generator with optical-electrical output depending on what type of TX is used, an ATT, programmable power monitor (PM), APD bias—programmable APD power supply, RX—apparatus under adjustment and setting with APD photo receiver, and a controller having an interface to personal computer (PC).

The present invention provides an apparatus for fully automated calibration and adjustment of an APD photo-receiver during the manufacturing process. The apparatus of the present invention calibrates the APD and optimizes the APD gain to define the device optimal operation point at fixed ambient temperature. The apparatus permits the determination of the optimal operation point of APD by measuring the BER or related characteristics over the full APD bias voltage scale. In an embodiment of the present invention, the apparatus provides for the measurements of both ATT and PM in a measured loop to adjust and to measure input optical power incident to the APD photo receiver.

Figure 3:
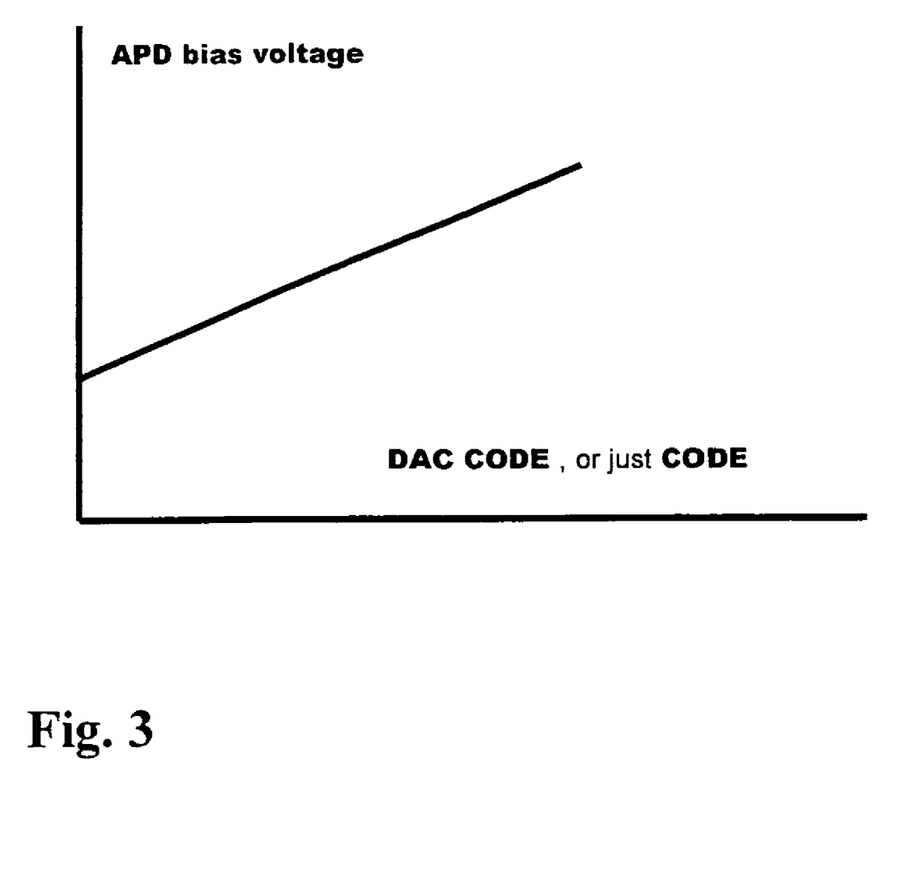
FIG. 3 is a diagram schematically illustrating a method of finding the APD operation point utilizing two regimes according to an embodiment of the present invention.

FIG. 3 depicts a flow chart of an embodiment of the method of the present invention, wherein the two regimes are employed to find the optimal APD operation point. The method of the present invention provides for two steps: 1) BERi>BER1 and 2) BERi+1>BERi+δ. In Step 1, if BERi>BER1, is not satisfied, then the optimal operation point has not been reached and the loop involving Step 1 continues. On the other hand, if BERi>BER1 is achieved then, Step 2 proceeds. In Step 2, if BERi+1>BERi+δ is not satisfied, then the optimal operation point has not been reached and Step 2 is repeated. However, if BERi+1>BERi+δ, is satisfied, then the optimal operation point has been determined. Accordingly, the values of constants δ and BER1 are defined by following equations:

$$BER1 = A * BER_1 \quad (2)$$

wherein A is an APD device parameter that depends on each device and that has generally a value of approximately between 5 and 20, for example. And $BER_1$ is a BER value obtained in the first point of the measurement. The constant δ is required to prevent making the determination based upon either the statistical and/or noise fluctuation of $BER_i$. The value of this constant is adjusted during manufacturing process.

According to the present invention, the process of determining and setting the optimal APD operation point setting is provided by using BER-related parameters, instead of BER. For example, such parameters are a Q-factor, or number of corrected errors ("0" and "1", correspondingly) in a Forward Error Correction block of RX unit, etc. Both parameters, Q-factor and corrected errors, are measured by conventional TX or RX systems themselves because of implementation of RX chip or DWDM internal processor, for example. The exemplary Q factor is defined as follows:

$$Q \text{ factor: } Q = abs\ (\mu_1 - \mu_0)/(\sigma_1 + \sigma_0) \quad (3)$$

In Eq. (3) abs $(\mu_1 - \mu_0)$ denotes the separation between the intensity level of "1" and "0" of digital signals, and $\sigma_1 + \sigma_0$ is the sum of the standard deviations of the intensities around levels of "1" and "0".

Based on the Gaussian approximation for the noise distribution in the received signal, the relation between BER and Q is defined as:

$$BER = \tfrac{1}{2} erfc(Q/sqrt(2)) \quad (4)$$

Figure 4:
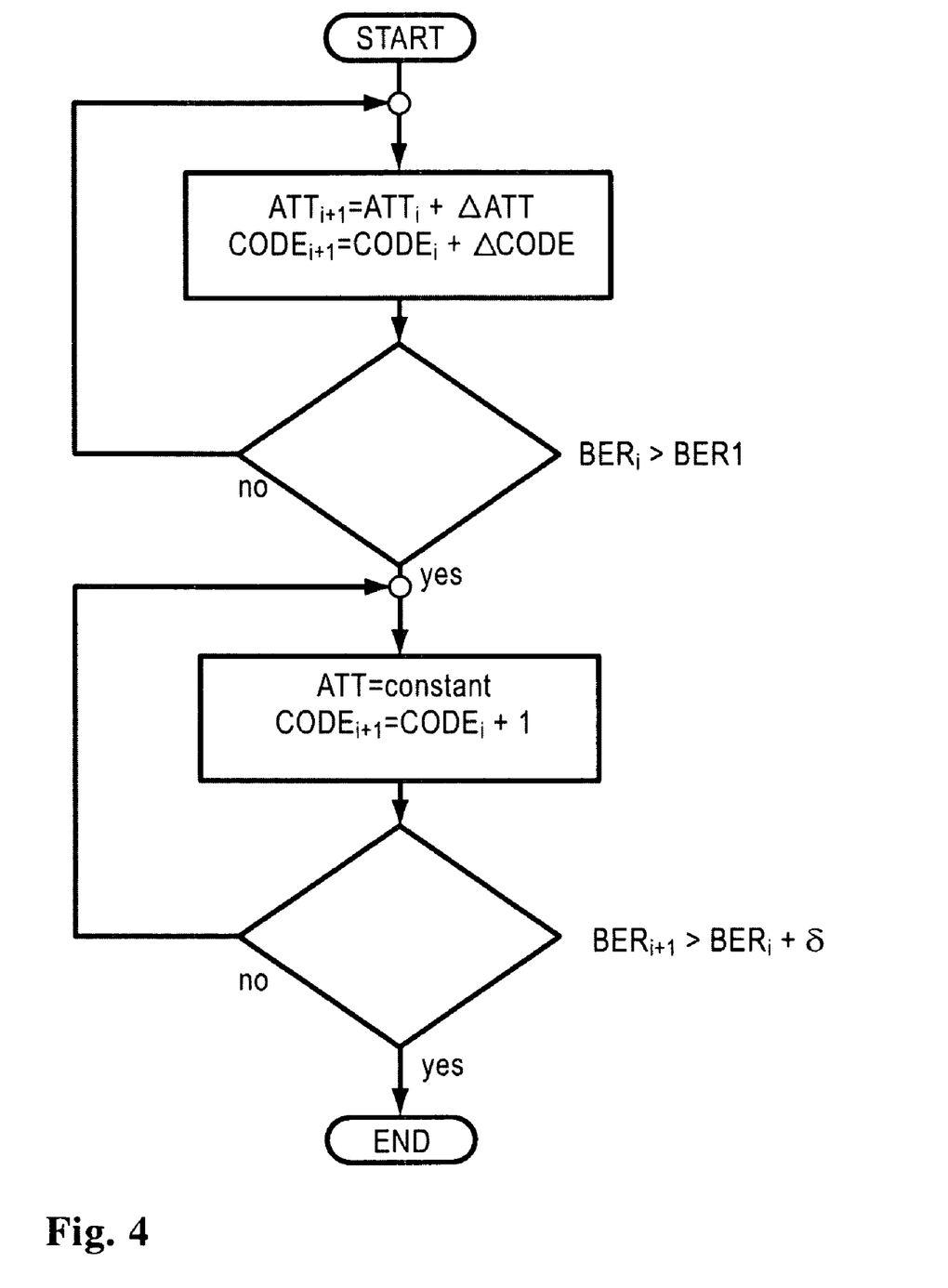
FIG. 4 is a flowchart illustrating a method of optimizing the APD operation point utilizing two regimes according to another exemplary embodiment of the present invention.

FIG. 4 is a flowchart illustrating a method of optimizing the APD operation point utilizing two regimes according to another exemplary embodiment of the present invention. In FIG. 4, the method starts at step S100, and continues to step S110, where a first value and a second value of the bias of an avalanche diode are measured. The first and second values may be measured at two successive times, wherein the two successive times are separated by a first time interval. Next, the method continues to step S120, where for each one of the two measured avalanche diode biases, a bit error rate is measured. According to various exemplary embodiments, the logarithm of the bit error rate may be recorded. Next, the method continues to step S130, where the measured bit error rate corresponding to the second value is compared to the bit error rate corresponding to the first value. If the bit error rate corresponding to the second value is smaller than the bit error rate corresponding to the first value, then the method continues to step S110, and two other first and second values of avalanche photodiode bias are measured. If the bit error rate corresponding to the second value is equal to or greater than the bit error rate corresponding to the first value, then the method continues to step S140.

During step S140, a third and fourth value of avalanche photodiode bias are measured at two successive times in a second time interval, but the second time interval is smaller than the first time interval. According to various exemplary embodiments, the second time interval may be significantly smaller than the first time interval. Next, the method continues to step S150, where the bit error rate corresponding to the third and fourth measured values of avalanche photodiode bias are measured. According to various exemplary embodiments, the logarithm of the measured bit error rate may be recorded. Next, control continues to step S160, where the bit error rate corresponding to the third avalanche photodiode bias value is compared to the bit error rate corresponding to the fourth avalanche photodiode bias value. If the bit error rate corresponding to the fourth avalanche photodiode bias value is smaller than bit error rate corresponding to the third avalanche photodiode bias value, then the method continues to step S140. If the bit error rate corresponding to the fourth avalanche photodiode bias value is equal to or greater than the bit error rate corresponding to the third avalanche photodiode bias value, then the method continues to step S170. In step S170, the optimal avalanche photodiode bias value is determined on the basis of the third and fourth measures avalanche photodiode values. For example, the optimal value may be the average of the third and fourth measures avalanche photodiode values. Next, the method continues to step S180, where the method ends.

Figure 5:
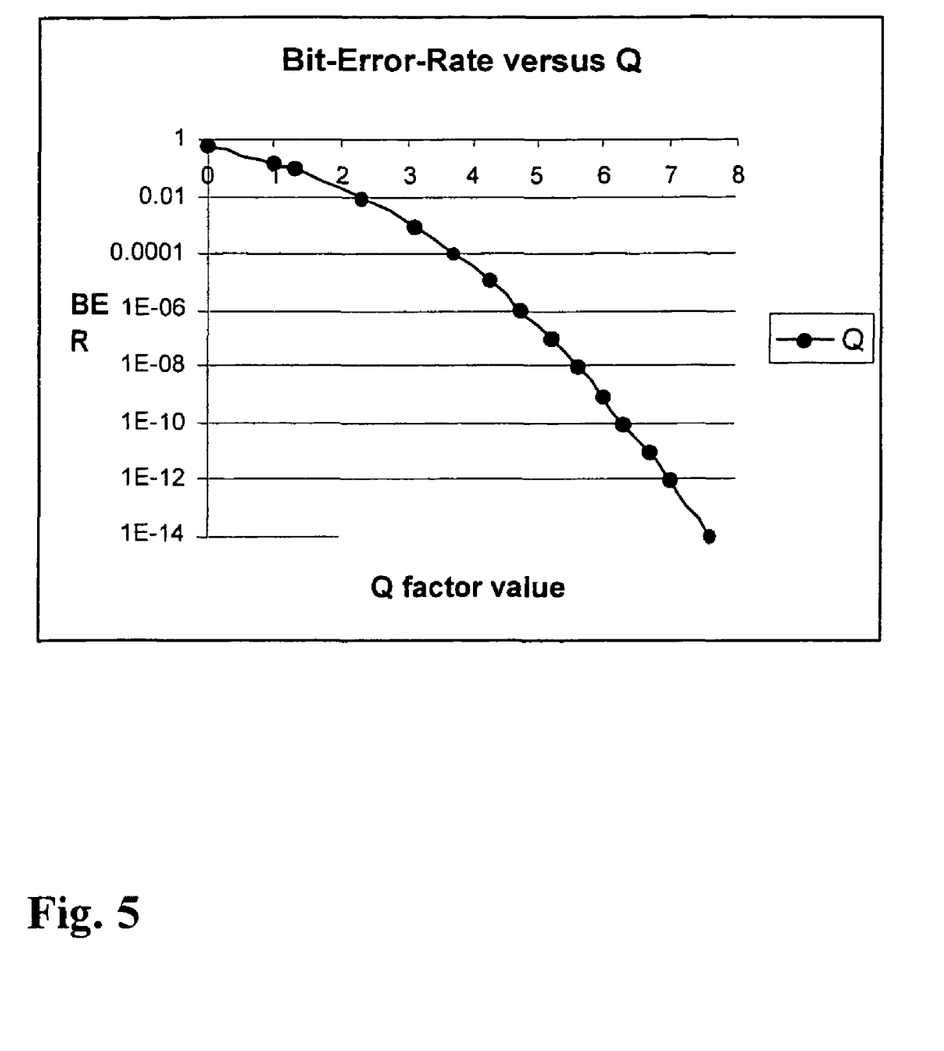
FIG. 5 is a curve illustrating the evolution of BER with respect to a Q factor according to an embodiment of the present invention.

FIG. 5 depicts the calculated dependence of BER on Q value according to the present invention. The direct relationship between BER and Q value shows that the largest Q values correspond to the optimal BER reached by optical network channels and is thusly correlated to the quality of specific channel. When using this dependence (Eq. 4), the signal distribution should be of a pure Gaussian form. The adjustment performed by using only the Q factor value may not be precisely correlated if the signal distribution is sufficiently non-Gaussian or the contribution of other factors, such as optical dispersion, additional pick-up noise, for example, are to be taken into account. In this embodiment, using other parameters, such as H (a histogram matrix for received data array) and BER, provides an exact solution.

In another embodiment of the present invention, the number of corrected errors, "0" and "1" correspondingly, in a Forward Error Correction block of RX unit is directly related to BER value and is utilized for automated determination of the optimal APD operation point. Utilizing other parameters, such as corrected errors, instead of BER, in some instances, is more convenient as a relatively expensive bit error rate tester (BERT) is not required. In this embodiment, the parameters are recorded in a FEC register of RX, for example, and are read therefrom.

Figure 6:
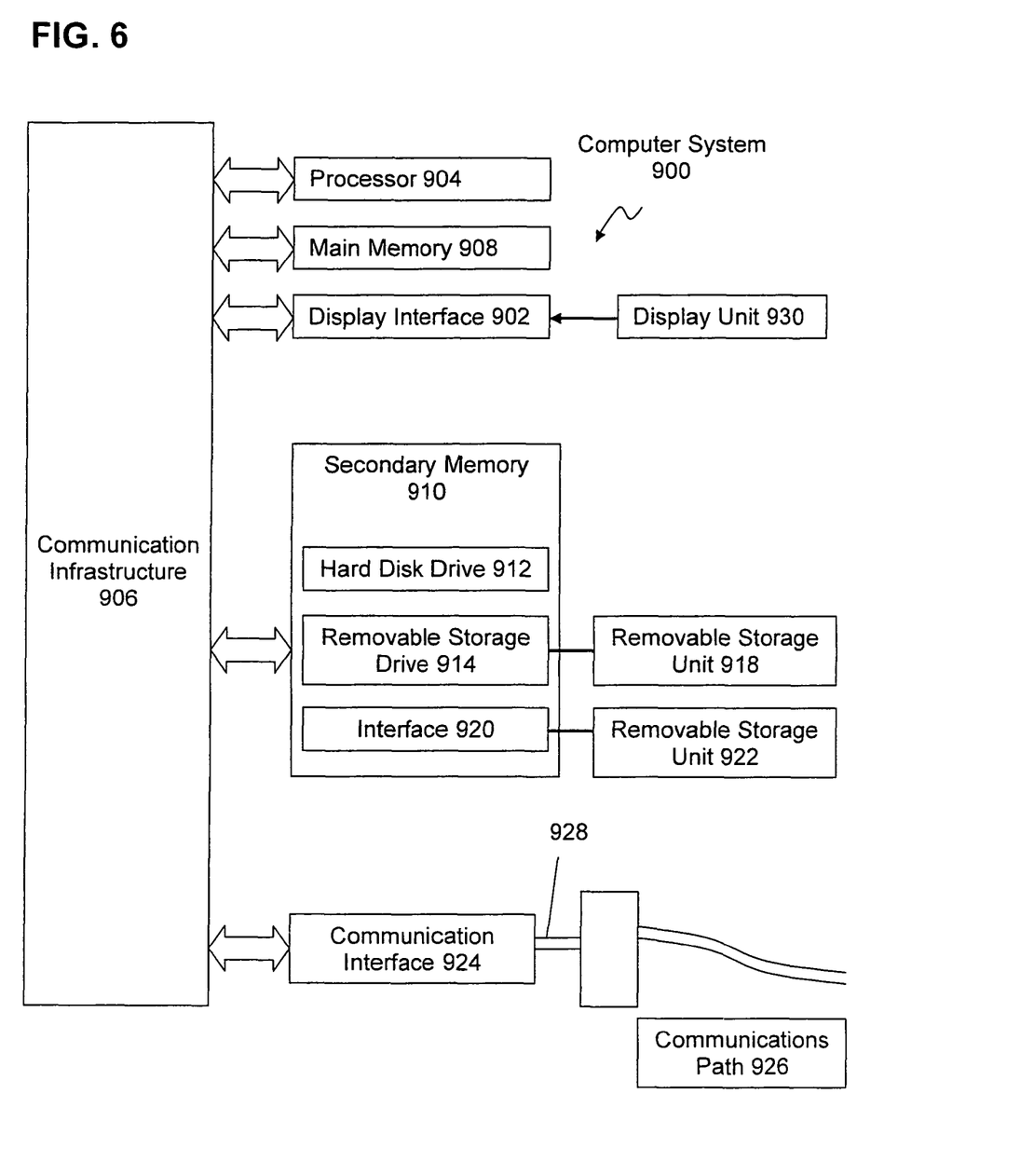
FIG. 6 presents an exemplary system diagram of various hardware components and other features, for use in accordance with an embodiment of the present invention.

The present invention may be implemented using hardware, software, or a combination thereof and may be implemented in one or more computer systems or other processing systems. In one embodiment, the invention is directed toward one or more computer systems capable of carrying out the functionality described herein. An example of such a computer system 900 is shown in FIG. 6.

Computer system 900 includes one or more processors, such as processor 904. The processor 904 is connected to a communication infrastructure 906 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative embodiments, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 970, and signals 928. These computer program products provide software to the computer system 900. The invention is directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features of the present invention, as discussed herein. In particular, the computer programs, when executed, enable the processor 910 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912, or communications interface 920. The control logic (software), when executed by the processor 904, causes the processor 904 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 7:
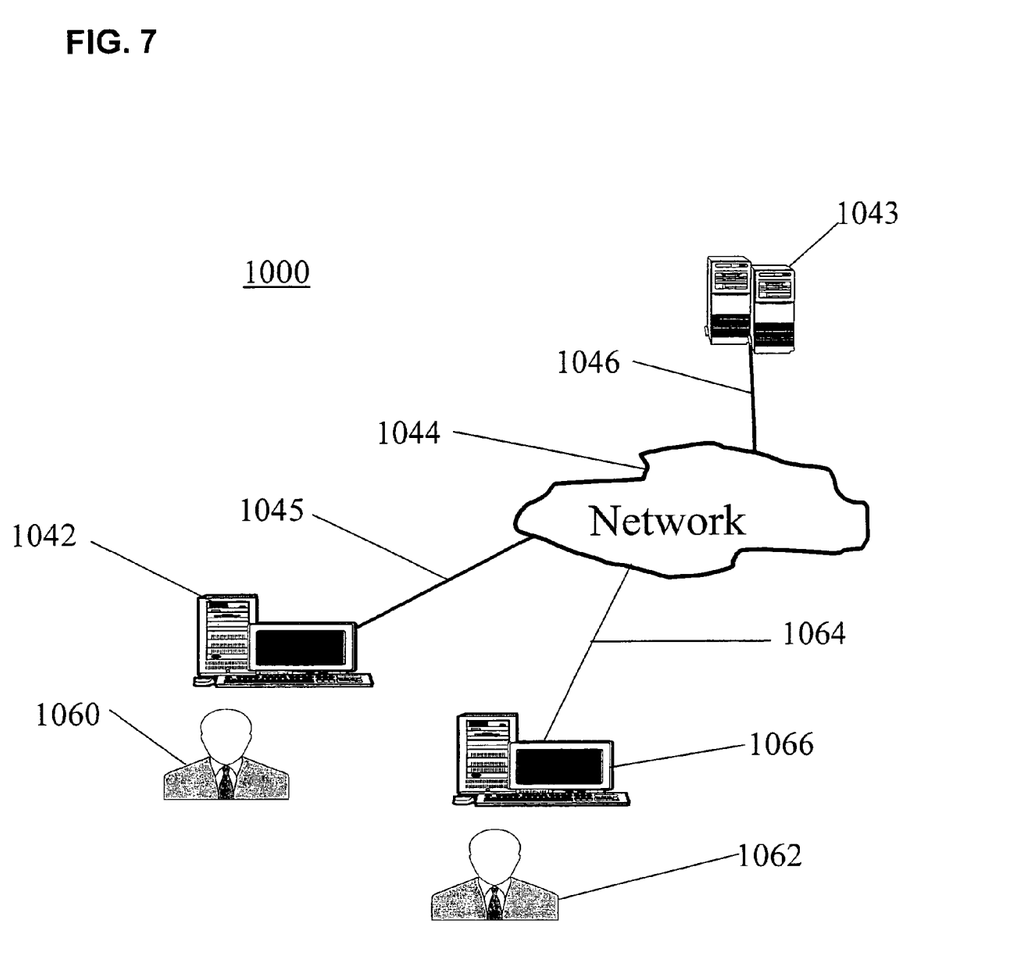
FIG. 7 is a block diagram of various exemplary system components, in accordance with an embodiment of the present invention.

FIG. 7 shows a communication system 1000 usable in accordance with the present invention. The communication system 1000 includes one or more accessors 1060, 1062 (also referred to interchangeably herein as one or more "users") and one or more terminals 1042, 1066. In one embodiment, data for use in accordance with the present invention is, for example, input and/or accessed by accessors 1060, 1064 via terminals 1042, 1066, such as personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 include, for example, wired, wireless, or fiberoptic links. In another embodiment, the method and system of the present invention operate in a stand-alone environment, such as on a single computer.

While the foregoing disclosure shows illustrative embodiments, it should be noted that various changes and modifications could be made herein without departing from the scope of the described embodiments.

What is claimed is:

1. A device for automated calibration of an avalanche photodiode receiver, comprising:
   a transmitter;
   a programmable attenuator functionally coupled to the transmitter;
   a programmable power monitor functionally coupled to the programmable attenuator; and
   a controller controlling operation of at least one of the transmitter, the attenuator and the power monitor;
   wherein the controller controls measurement of an avalanche photodiode bias via at least one of the attenuator and the power monitor to determine a minimum bit error rate of the avalanche photodiode receiver.

2. The device of claim 1, wherein the transmitter is a complex line card with a short reach optical transceiver input and long haul dense wavelength division multiplexing output with processor.

3. The device of claim 1, wherein the transmitter includes an optical laser with an electrical input interface.

4. The device of claim 1, wherein the transmitter includes a bit error rate tester packet generator.

5. The device of claim 1, wherein the transmitter includes a packet generator with optical electrical output.

6. A computer-implemented method for automated calibration of an avalanche photodiode receiver, the computer comprising a processor and an accessible repository, the method comprising:
   measuring via the processor a first value and a second value of avalanche photodiode bias at two successive times of a first interval;
   measuring, for each of the first value and second value of the avalanche photodiode bias, a bit error rate;
   comparing the bit error rate of the first value and the bit error rate of the second value;
   when the bit error rate of the second value is smaller than the bit error rate of the first value, measuring two additional values as first value and second value at successive time of the first interval; and
   when the bit error rate of the second value is equal to or greater than the bit error rate of the first value, measuring a third value and a fourth value of avalanche photodiode bias at two successive times of a second interval smaller than the first interval;
   wherein when the bit error rate of the fourth value is smaller than the bit error rate of the third value, measuring two subsequent values as third value and fourth value at successive times of the second interval, and determining an optimum avalanche photodiode bias when the bit error rate of the fourth value is equal to the bit error rate of the third value.

7. The method of claim 6, wherein the measured bit error rate is a logarithm of an actual bit error rate.

8. The method of claim 6, wherein the avalanche photodiode bias is measured via at least one of an attenuator and a power monitor.

9. A system for automated calibration of an avalanche photodiode receiver, the system comprising:
   means for measuring a first value and a second value of avalanche photodiode bias at two successive times of a first interval;
   means for measuring, for each of the first value and second value of the avalanche photodiode bias, a bit error rate;
   means for comparing the bit error rate of the first value and the bit error rate of the second value;
   means for measuring two additional values as first value and second value at successive time of the first interval when the bit error rate of the second value is smaller than the bit error rate of the first value; and
   means for measuring a third value and a fourth value of avalanche photodiode bias at two successive times of a second interval smaller than the first interval when the bit error rate of the second value is equal to or greater than the bit error rate of the first value;
   means for measuring two subsequent values as third value and fourth value at successive times of the second interval when the bit error rate of the fourth value is smaller than the bit error rate of the third value, and
   means for determining an optimum avalanche photodiode bias when the bit error rate of the fourth value is equal to the bit error rate of the third value.

10. A system for automated calibration of an avalanche photodiode receiver, the system comprising:
    a processor;
    a user interface functioning via the processor; and
    a repository accessible by the processor; wherein
    a first value and a second value of avalanche photodiode bias are measured at two successive times of a first interval;
    a bit error rate is measured for each of the first value and second value of the avalanche photodiode bias;
    the bit error rate of the first value and the bit error rate of the second value are compared;
       when the bit error rate of the second value is smaller than the bit error rate of the first value, two additional values as first value and second value at successive time of the first interval are measured; and
       when the bit error rate of the second value is equal to or greater than the bit error rate of the first value, a third value and a fourth value of avalanche photodiode bias at two successive times of a second interval smaller than the first interval are measured;
       wherein when the bit error rate of the fourth value is smaller than the bit error rate of the third value, two subsequent values as third value and fourth value at successive times of the second interval are measured, and an optimum avalanche photodiode bias is determined when the bit error rate of the fourth value is equal to the bit error rate of the third value.

11. The system of claim 10, wherein the processor is housed on a terminal.

12. The system of claim 11, wherein the terminal is selected from a group consisting of a personal computer, a minicomputer, a main frame computer, a microcomputer, a hand held device, and a telephonic device.

13. The system of claim 10, wherein the processor is housed on a server.

14. The system of claim 13, wherein the server is selected from a group consisting of a personal computer, a minicomputer, a microcomputer, and a main frame computer.

15. The system of claim 13, wherein the server is coupled to a network.

16. The system of claim 15, wherein the network is the Internet.

17. The system of claim 15, wherein the server is coupled to the network via a coupling.

18. The system of claim 17, wherein the coupling is selected from a group consisting of a wired connection, a wireless connection, and a fiberoptic connection.

19. The system of claim 10, wherein the repository is housed on a server.

20. The system of claim 19, wherein the server is coupled to a network.

21. A computer program product comprising a computer usable medium having control logic stored therein for causing a computer to automatically calibrate an avalanche photodiode receiver, the control logic comprising:

first computer readable program code means for measuring a first value and a second value of avalanche photodiode bias at two successive times of a first interval;

second computer means for measuring, for each of the first value and second value of the avalanche photodiode bias, a bit error rate;

third computer means for comparing the bit error rate of the first value and the bit error rate of the second value;

fourth means for measuring two additional values as first value and second value at successive time of the first interval when the bit error rate of the second value is smaller than the bit error rate of the first value;

fifth means for measuring a third value and a fourth value of avalanche photodiode bias at two successive times of a second interval smaller than the first interval when the bit error rate of the second value is equal to or greater than the bit error rate of the first value; and sixth means for measuring two subsequent values as third value and fourth value at successive times of the second interval when the bit error rate of the fourth value is smaller than the bit error rate of the third value, and seventh means for determining an optimum avalanche photodiode bias when the bit error rate of the fourth value is equal to the bit error rate of the third value.

\* \* \* \* \*